United States Patent [19]

Snoeren et al.

[11] Patent Number: 5,412,705
[45] Date of Patent: May 2, 1995

[54] X-RAY EXAMINATION APPARATUS WITH AN IMAGING ARRANGEMENT HAVING A PLURALITY OF IMAGE SENSORS

[75] Inventors: Rudolph M. Snoeren; Jan W. Slotboom, both of Eindhoven, Netherlands

[73] Assignee: U.S. Philips Corporation, New York, N.Y.

[21] Appl. No.: 108,865

[22] Filed: Aug. 18, 1993

[30] Foreign Application Priority Data

Aug. 18, 1992 [EP] European Pat. Off. ............ 92202521
Dec. 29, 1992 [EP] European Pat. Off. ............ 92204101

[51] Int. Cl.$^6$ ............................................. H04N 1/00
[52] U.S. Cl. ................................. 378/98.3; 378/98.8; 250/487.1
[58] Field of Search ............ 378/98.2, 98.3, 98.7, 378/98.8; 250/487.1, 483.1

[56] References Cited

U.S. PATENT DOCUMENTS

| | | |
|---|---|---|
| 3,944,835 | 3/1976 | Vosburgh ............... 250/487.1 |
| 4,479,061 | 10/1984 | Koizumi et al. . |
| 4,503,460 | 3/1985 | Sklebitz . |
| 5,235,191 | 8/1993 | Miller .................. 378/98.2 X |

FOREIGN PATENT DOCUMENTS 3207085 9/1983 Germany ................... H04N 5/32

OTHER PUBLICATIONS

"Experimental Observation of Avalanche Multiplication in Charge-Coupled Devices" Madan et al, IEEE Trans. on Electron Devices, vol. ED-30, No. 6 Jun. 1983, pp. 694–699.

Primary Examiner—David P. Porta
Attorney, Agent, or Firm—Jack D. Slobod

[57] ABSTRACT

An x-ray examination apparatus includes an imaging arrangement, devised for performing fluoroscopy. Which has image sensors that are efficiently optically coupled with an x-ray sensitive radiation conversion screen. Consequently, the image sensors produce an electrical signal having a high signal-to-noise ration when low doses of x-radiation are administered. An x-ray conversion screen is provided with a tapetum filter so as to concentrate light in the forward direction. Furthermore, the x-ray conversion screen is preferably fitted with a light reflecting layer for reflecting light that has been reflected by the tapetum filter, said light reflecting layer being transparent for x-radiation. Further concentration of light in the forward direction is achieved by placing a light-transparent material having a suitable refractive index between the radiation conversion screen and lenses that concentrate the light onto the image sensors. Semiconductor image sensors in the form of charge-coupled devices are provided for converting a visible image into an electronic video signal. In order to improve the effectiveness of the CCDs, weak avalanching is applied so as to increase both sensitivity and signal-to-noise ratio of the sensors.

13 Claims, 2 Drawing Sheets

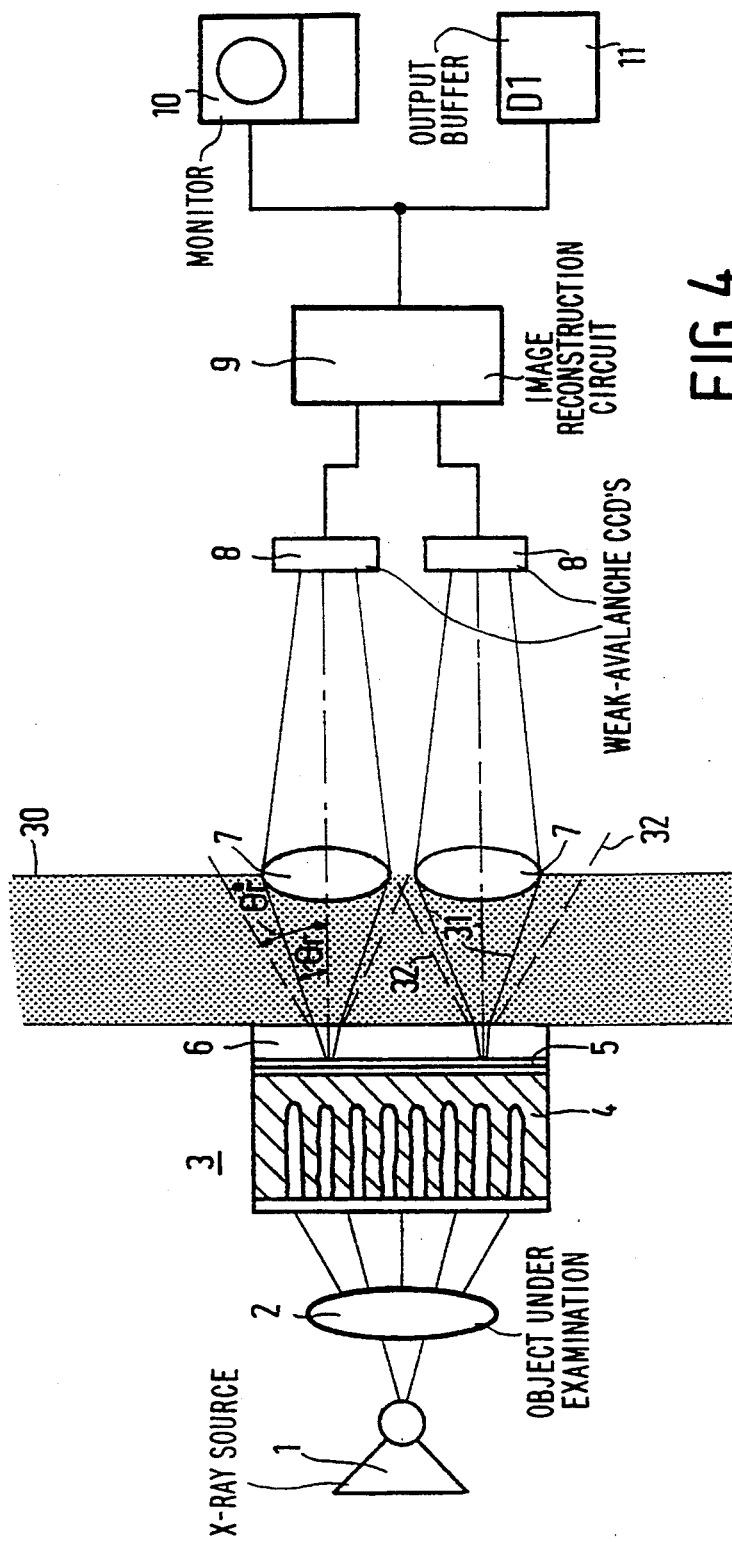

X-RAY EXAMINATION APPARATUS WITH AN IMAGING ARRANGEMENT HAVING A PLURALITY OF IMAGE SENSORS

BACKGROUND OF THE INVENTION

1. Field of the Invention

The invention pertains to an x-ray examination apparatus including an x-ray source, an imaging arrangement including a radiation conversion means facing the x-ray source, for convening image carrying x-radiation into image carrying visible radiation, an image conversion means having a plurality of image sensors for converting the image carrying visible radiation formed by the radiation conversion means into an electrical signal, and a plurality of lenses aligned with the radiation conversion means, so that respective regions of the radiation conversion means are imaged on respective image sensors. The invention also relates to an imaging arrangement for use in an x-ray examination apparatus, and relates to a radiation conversion means for use in an x-ray apparatus.

2. Description of the Related Art

An x-ray examination apparatus of said kind is described in the U.S. Pat. No. 4,503,460.

An x-ray examination apparatus as described in the cited reference comprises multiple image conversion means in that a plurality of semiconductor image sensors and optical coupling means having a plurality of lenses are provided for imaging respective regions of an output screen of an x-ray image intensifier onto respective semiconductor image sensors.

Various radiological examination procedures require that low doses of radiation are administered to an object. In particular, this is the case when a medical examination procedure is performed in a fluoroscopy mode. The performance of an x-ray examination apparatus as described in the cited reference will not be fully satisfactory. The output screen of the image intensifier radiates its output light according substantially to Lambert's law. The area of the output screen is much larger than the area of a charge-coupled device according to presently available technology, therefore, optical coupling means are required for imaging regions of the output screen onto respective charge-coupled devices. According to the apparatus described in the cited reference, said optical coupling means consists of a plurality of lenses. Each of said lenses has a numerical aperture which is less than 1, or equivalently, its angle of acceptance is less than 90°. The respective regions of the output screen of the image intensifier being much larger than an area of each of said respective charge-coupled devices, a considerable demagnification is required for each of said lenses. Hence, the optical efficiency of the optical coupling means is substantially reduced, so that the intensity of the light arriving at the charge-coupled devices is insufficient for performing accurate fluoroscopic examinations.

SUMMARY OF THE INVENTION

It is inter alia an object of the invention to provide an x-ray examination apparatus having an imaging arrangement comprising a radiation conversion means incorporating an x-ray sensitive phosphor layer, and the imaging arrangement comprising image conversion means being efficiently optically coupled with the radiation conversion means, for producing an electrical signal having a high signal-to-noise ratio when low doses of x-radiation are administered by the x-ray source.

To achieve this, an x-ray examination apparatus in accordance with the invention is characterized in that the imaging arrangement comprises means for concentrating a light intensity distribution produced by the radiation conversion means, substantially in a single direction.

By way of the radiation conversion means, incident x-radiation is converted into visible radiation having a radiation for which the image conversion means are sensitive. Visible radiation is to be understood herein to imply radiation having a wavelength in a range of wavelengths pertaining to ultraviolet radiation to wavelengths pertaining to infrared radiation. Semiconductor image sensors, notably charge-coupled devices (CCDs), being devised for converting radiation having a wavelength in said range into electrical signals, produced according to the presently available technology have an area that is much smaller than the area of a radiation conversion means. Optically imaging a region of the radiation conversion means onto a semiconductor image sensor involves considerable demagnification. Concentrating the light intensity distribution, emitted from the radiation conversion means, substantially in a direction normal to the radiation conversion means reduces an amount of light bypassing optical coupling means. Therefore, sufficient light intensity available from the radiation conversion means is retained at a relevant semiconductor image sensor. Consequently, optical coupling of the radiation conversion means to the image conversion means is made more efficient in an imaging arrangement in accordance with the invention.

A preferred embodiment of an x-ray examination apparatus in accordance with the invention, wherein said radiation conversion means has the form of a radiation conversion screen comprising an x-ray sensitive phosphor layer, is characterized in that said radiation conversion screen comprises a layer at a side of the x-ray sensitive phosphor layer facing the x-ray source, for transmitting x-radiation and reflecting visible radiation and comprises, on a side of the x-ray sensitive phosphor layer opposite the side facing the x-ray source, a tapetum filter having a substantial transmittivity for light having an angle of incidence in a region around normal incidence and having a substantial reflectivity of light having an angle of incidence beyond said region.

Providing the radiation conversion screen with a tapetum filter causes the radiation conversion screen to emit light substantially in a direction normal to the surface of the radiation conversion screen. I.e. the light output from a radiation conversion screen provided with a tapetum filter has an intensity distribution that is more concentrated in the forward propagation direction of the emitted light, as compared to a Lambert-distribution that is pertinent to a uniformly radiating surface. It is to be noted that a tapetum filter per se is known from the field of projection television as disclosed in the European Patent EP 0 170 320. A tapetum filter is preferably fabricated from a stack of alternatingly a material having a high and a material having a low refractive index for a relevant region of wavelengths. High transmittivity for substantially perpendicularly incident light and simultaneously high reflectivity for obliquely incident light is achieved by making use of interferences of light reflected from various interfaces between different layers of the stack. However, as compared to employing a tapetum filter in projection television tubes, in the present invention a tapetum filter is required that concentrates the light intensity distribution within a narrower cone. This is achieved by adapting the optical thickness of the layers comprising the stack, and by making use of scaling relations of the angle of the cone into which light is emitted by the tapetum filter, with the optical thickness of the layers comprising the stack. The concentration of the light intensity distribution is further enhanced by providing the radiation conversion screen at the side that is exposed to x-radiation with a layer of material that is on the one hand transparent to x-radiation and on the other hand reflecting for visible radiation. Therefore, light being reflected by the tapetum filter is not entirely discarded, but is partially transmitted by the tapetum filter after multiple reflections.

A further preferred embodiment of an x-ray examination apparatus in accordance with the invention is characterized in that the x-ray sensitive phosphor layer comprises voids, each of them having a longitudinal axis substantially perpendicular to the layer.

Providing an x-ray sensitive phosphor layer comprising cracks, transverse to the layer further increases concentration in the forward direction of the light intensity distribution output by the radiation conversion screen. The cracks, i.e. voids having longitudinal axis in a direction substantially perpendicular to the x-ray sensitive phosphor layer act as guiding means for light rays travelling back and forth through the x-ray sensitive phosphor layer; said rays being reflected by both the tapetum filter and by the x-ray transmitting and visible radiation reflecting layer facing the x-ray source.

A further preferred embodiment of an x-ray examination apparatus in accordance with the invention is characterized in that the means for concentrating the light intensity distribution produced by the radiation conversion means substantially in a single direction comprises a material being transparent for said light and having a refractive index-value greater than the refractive index value of air.

By providing a material having a suitable refractive index and being transparent it is achieved that refraction away from the normal to the surface of the radiation screen occurs at a decreased angle of refraction as compared to the situation where light travels from the radiation conversion through air to the system of lenses. Thus the refracted light is further directed towards the normal to the surface of the radiation conversion screen. Thus further concentration of light intensity distribution in a direction normal to the surface of the radiation conversion screen is obtained.

A further preferred embodiment of an x-ray examination apparatus in accordance with the invention and wherein the image sensors are semiconductor image sensors is characterized in that said semiconductor image sensors are arranged for performing charge multiplication by impact ionization having an associated gain factor, a signal-to-noise ratio of an output signal produced by a respective semiconductor image sensor being substantially at a local maximum as a function of the gain factor.

The sensitivity of a semiconductor image sensor, comprising a photodiode, notably a CCD-sensor is improved by making use of an avalanche effect. Carrier multiplication occurs through impact ionization when across a depletion layer of a photo-diode a sufficiently strong electric field is applied. By making use of the avalanching effect, i.e. charge multiplication by impact ionization, the signal can be enhanced. By repeatedly weak-avalanching it is achieved to provide an image detector having both improved signal-to-noise ratio and improved sensitivity. This signal enhancement can be described by a gain factor. However, because impact ionization itself is a random process, avalanching inevitably gives rise to increase of noise. The ensuing excess noise can be described by means of an excess noise factor which describes the extent to which noise due to avalanching increases in excess of the increase that can be attributed to average charge multiplication. Said excess noise factor is an increasing function of the gain factor. Moreover, there occur additive noise sources in a CCD, such as notably surface dark current generation, transfer noise reset noise and amplifier noise. As a consequence, avalanching increases both signal and noise, but the ensuing signal-to-noise ratio exhibits a maximum as a function of the gain factor. By avalanching weakly, i.e. at a gain factor pertaining to said maximum, repeatedly, both an increased sensitivity and an improved signal-to-noise ratio for an semiconductor image sensor are achieved. It is noted that avalanche multiplication of carriers is known per se from IEEE Trans. Electron. Devices ED-30 (1983) 694-699.

A further preferred embodiment of an x-ray apparatus in accordance with the invention wherein said image sensors comprise a plurality of light sensitive sensor elements, is characterised in that said image sensors are arranged for at option combining signals from groups of sensor elements of said image sensors.

Application of fluoroscopy during which low doses of x-radiation are administered to an entire object, is often alternated by application of exposure to higher doses of x-radiation to selected parts of the object. During fluoroscopy it is more of importance to have the image sensor operating at a high sensitivity, instead of having a high spatial resolution. Improving sensitivity at the expense of reducing spatial resolution is achieved by combining groups of neighbouring sensor elements in a CCD-sensor during fluoroscopy.

An imaging arrangement for use in an x-ray examination apparatus in accordance the invention preferably comprises means for concentrating a light intensity distribution produced by the radiation conversion means substantially in a single direction, each of the lenses having with respect to its dimension, a comparatively large angle of acceptance and the image sensors being arranged for increasing a signal-to-noise ratio of said electronical signal.

Radiation conversion means in the form of a radiation conversion screen for use in an x-ray examination apparatus in accordance with the invention preferably comprises a layer at a side of the radiation conversion screen facing the x-ray source, for transmitting x-radiation and reflecting visible radiation and comprises a tapetum filter on a side of the radiation screen opposite the side facing the x-ray source, having a substantial transmittivity for light having an angle of incidence in a region around normal incidence and having a substantial reflectivity of light having an angle of incidence beyond said region.

These and other aspects of the invention will become apparent from and elucidated with reference to the embodiments described hereinafter and with reference to the accompanying drawing.

BRIEF DESCRIPTION OF THE DRAWING

FIG. 4 shows a block schematic of another embodiment of an x-ray examination apparatus in accordance with the invention.

DETAILED DESCRIPTION OF THE PREFERRED EMBODIMENTS

Figure 1:
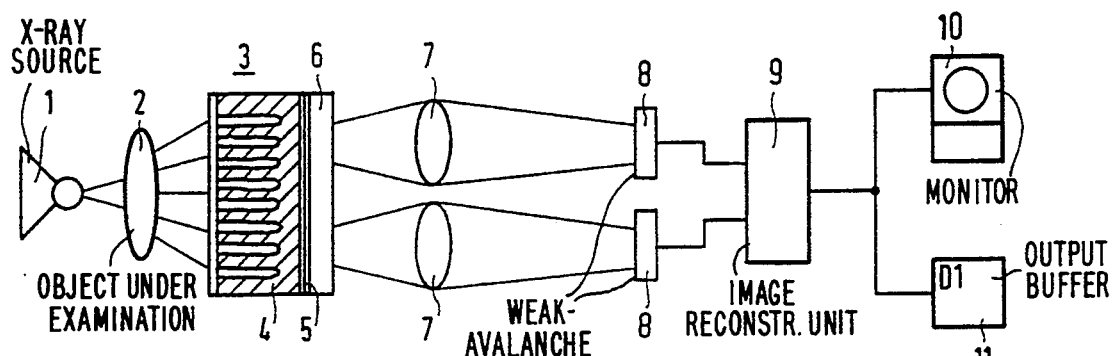
FIG. 1 shows a block schematic of an embodiment of an x-ray examination apparatus in accordance with the invention.

FIG. 1 shows a block schematic of an x-ray examination apparatus in accordance with the invention. An x-ray source 1 is arranged for irradiating an object 2 and radiation passed through the object forms an x-ray image on a front side of a radiation conversion means. The radiation conversion means in the form of a radiation conversion screen 3 comprises an x-ray sensitive phosphor layer 4, notably containing an x-ray sensitive phosphor material that in response to impinging x-radiation emits visible radiation having a wavelength that is in correspondence with a maximum of the sensitivity of the plurality of semiconductor image sensors 8, here having the form of weak-avalanche charge coupled devices 8. The x-ray sensitive phosphor material converts x-radiation into visible radiation, thereby generating a visible image, in correspondence with the x-ray image, on the rear side of the radiation conversion screen. A preferred x-ray sensitive phosphor material comprises CsI that is activated by adding Tl. When x-radiation impinges upon such an x-ray sensitive phosphor material the material emits visible radiation having a distribution wavelengths mainly pertaining to green light, corresponding to wavelengths for which the semiconductor image sensors 8 have maximum sensitivity. By way of a tapetum filter 5 that is mounted on a glass substrate 6, light is emitted predominantly substantially normal to the rear surface of the radiation conversion screen. By way of lenses 7 having a high numerical aperture, regions of the rear surface of the radiation conversion screen are imaged on respective weak-avalanche charge coupled devices 8. In order to improve efficiency of the optical coupling of the semiconductor image sensors to the radiation conversion screen, preferably each of the lenses 7 have a numerical aperture that is large in relation to its dimension. The weak-avalanche CCDs 8 convert respective regions visible image into electrical video signals. By way of image recombination circuit means 9 the output video signals of the weak-avalanche CCDs are assembled into a recombined video signal. The recombined video signal can be supplied to a monitor 10 for viewing, or can be supplied to an output buffer circuit means 11 for further processing. An image conversion means is formed by the plurality of semiconductor image sensors 8 and the image recombination circuit means 9. The image conversion means together with the radiation conversion screen 3 and the lenses 7 constitute an embodiment of an imaging arrangement in accordance with the invention.

Figure 2:
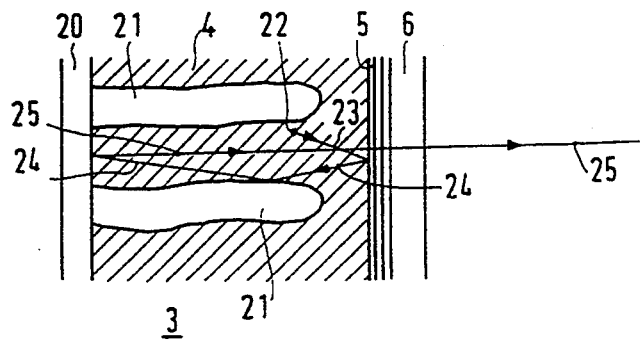
FIG. 2 shows a detailed view of part of a radiation conversion screen incorporated in an imaging arrangement for an x-ray examination apparatus in accordance with the invention.

FIG. 2 shows an detailed view of part of a radiation conversion screen 3 incorporated in an x-ray examination apparatus in accordance with the invention. Providing an x-ray sensitive phosphor layer comprising crystals of a material exhibiting fluorescence upon incidence of x-radiation having needle-structured morphology, such that the long-axes of the needle-structure are substantially aligned perpendicularly to the surface of the scintillation screen yields an intensity distribution that is more concentrated in the forward propagation direction of the emitted light, as compared to a Lambert-distribution that is pertinent to a uniformly radiating surface. The x-ray sensitive phosphor layer 4, notably consisting of CsI(Tl) is grown on an x-ray transparent layer 20 in such a fashion that the x-ray sensitive phosphor layer attains a needle-like structure. That is, the x-ray sensitive phosphor layer 4, comprises voids 21, each having a longitudinal axis substantially aligned normal to the surface of the x-ray sensitive phosphor layer. In combination with a tapetum filter 5, this needle-like structure of voids 21 concentrates the intensity distribution of the visible light in a direction substantially perpendicular to the rear surface of the x-ray fluorescence screen. E.g. at a position indicated by reference numeral 22, a light ray 23 is generated by incident x-radiation, said light having a propagation direction obliquely to the normal of the rear surface. Owing to the high reflectivity of the tapetum filter 5, for light incident with an angle of incidence exceeding a cut-off value, the light ray 23 is reflected as light ray 24, which is subsequently reflected by a void 21 and is again reflected as light ray 25, by the layer 20 that is reflecting for light and transmitting for x-radiation. Such a layer can be made from a material that is highly reflecting to visible radiation and by making the layer thin so that it is transmitting for x-radiation. Preferably the layer 20 is formed from a material from the group $TiO_2$, $Al_2O_3$ or Al. Owing to the needle-structure of the x-ray sensitive phosphor layer 4, the light originally emitted obliquely with respect to the normal of the rear surface of the screen 3 is finally reflected by the front layer 20 substantially normal to the rear surface of the screen 3, so that it is incident on the tapetum filter with an angle of incidence that is smaller than the cut-off value, so that the light ray 25 is transmitted by the tapetum filter without substantial loss of intensity and within the acceptance cone of a relevant lens 7.

A tapetum filter 5 is preferably fabricated from a stack of alternatingly a material having a high and a material having a low refractive index for a relevant region of wavelengths. High transmittivity for substantially perpendicularly incident light and simultaneously high reflectivity for obliquely incident is achieved by making use of interferences of light reflected from various interfaces between different layers of the stack. This phenomenon is achieved inter alia in a quarterwave stack, i.e. a stack comprising a plurality layers having an optical thickness for a relevant wavelength that is substantially equal to one fourth of said relevant wavelength.

Figure 3:
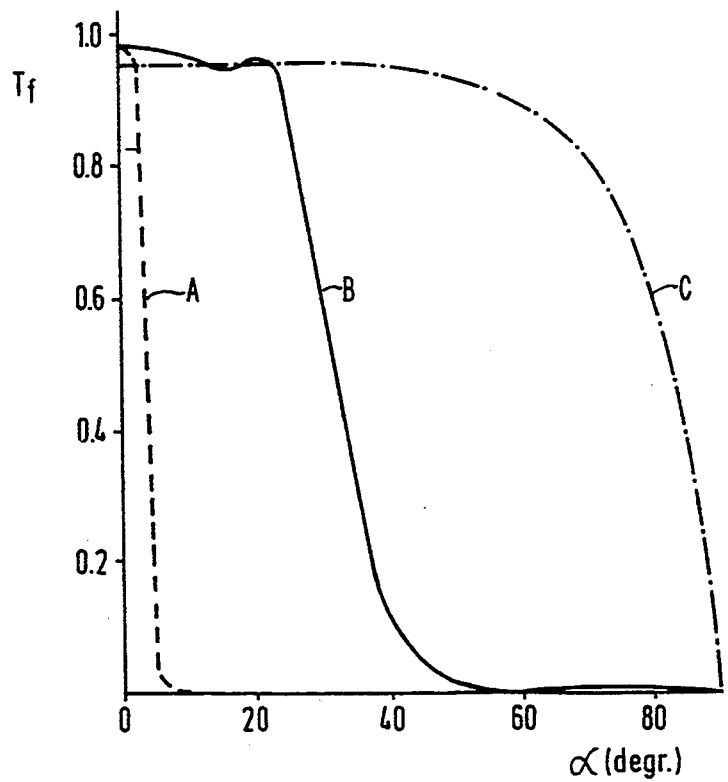
FIG. 3 shows transmission characteristics of two alternative tapetum filters incorporated in a radiation conversion screen for an imaging arrangement in accordance with the invention and a transmission characteristic of a radiation conversion screen not provided with an tapetum filter.

The dashed curve A drawn in FIG. 3 shows a transmission characteristic of a tapetum filter comprising a stack of 20 layers of alternating a low refractive index material $SiO_2$ and a high refractive index material $TiO_2$. The transmittivity or transmittance $T_f$ is presented as a function of the incidence angle $\alpha$ for light having a wavelength λ=544 nm in vacuo. The solid curve B drawn in FIG. 3 represents the transmittance $T_f$ as a function of α of a radiation conversion screen provided with this tapetum filter. The dotted and dashed curve C is drawn for comparison and represents the transmittance of a radiation conversion screen not provided with a tapetum filter, i.e. the dashed curve pertains to a uniformly radiating surface, i.e. the dashed curve corresponds to a Lambertian distribution. As appears from FIG. 3, the transmittance of the radiation conversion screen provided with a tapetum filter is approximately unity for light having an incidence angle less than approximately 30°, and the transmittance decreases rapidly when the incidence angle increases beyond 30°. Thus, the tapetum filter has as an effect as required, that light being substantially perpendicularly incident is transmitted unaffected, whereas, light being obliquely incident on the tapetum filter is substantially totally reflected by the tapetum filter. In order to further enhance concentration of light emission from the radiation conversion screen in a forward direction, a tapetum filter having a transmission angle less than a few degrees (e.g. less than 2°) is preferably employed.

FIG. 4 shows a block schematic of another embodiment of an x-ray examination apparatus in accordance with the invention. In this embodiment further improvement of concentrating light on the semiconductor image sensor is achieved by providing a transparent material 30 having a suitable refractive index in the region between the radiation conversion screen 3 and the lenses 7. As is shown in FIG. 4 ray-paths 31 of light travelling from the radiation conversion screen 3 towards the lenses 7 are influenced so as to achieve concentrating light in a direction towards the lenses. Because of the transparent material 30 having a refractive index value greater than the refractive index for air, the angle of refraction $\theta_r$ is reduced as compared to the angle of refraction $\theta_r{}^0$ for light-rays travelling from the screen into air. For illustration of the advantageous effect of the material 30 on concentrating light in dashed lines the ray-paths 32 are shown along which the light would travel when the material 30 is replaced by air.

What is claimed is:

1. An x-ray examination apparatus comprising an x-ray source, an imaging arrangement comprising a radiation conversion means facing the x-ray source, for converting image carrying x-radiation into image carrying visible radiation, image conversion means having a plurality of image sensors for converting the image carrying visible radiation formed by said radiation conversion means into an electrical signal, and a plurality of lenses aligned with the radiation conversion means, so that respective regions of said radiation conversion means are imaged on respective ones of said image sensors, and further comprising multilayer means intermediate the image sensors and the lenses for concentrating a light intensity distribution produced by the radiation conversion means substantially in a single direction by transmitting light having an angle of incidence in a region around normal incidence and reflecting light having an angle of incidence beyond said region.

2. An x-ray examination apparatus as claimed in claim 1, wherein said radiation conversion means has the form of a radiation conversion screen comprising an x-ray sensitive phosphor layer, and wherein said radiation conversion screen comprises a layer at a side of the x-ray sensitive phosphor layer facing the x-ray source, for transmitting x-radiation and reflecting visible radiation and wherein the means for concentrating the light intensity distribution produced by the radiation conversion means substantially in a single direction comprises a tapetum filter on a side of the x-ray sensitive phosphor layer opposite the side facing the x-ray source.

3. An x-ray examination apparatus as claimed in claim 2, wherein the x-ray sensitive phosphor layer comprises voids, each of them having a longitudinal axis substantially perpendicular to the layer.

4. An x-ray examination apparatus as claimed in claim 3, wherein the means for concentrating the light intensity distribution produced by the radiation conversion means substantially in a single direction comprises a material that is transparent for said light and has a refractive index value greater than the refractive index value of air.

5. An x-ray examination apparatus as claimed in claim 4, wherein the image sensors are semiconductor image sensors, wherein said semiconductor image sensors are arranged for performing charge multiplication by impact ionization having an associated gain factor, a signal-to-noise ratio of an output signal produced by a respective semiconductor image sensor being substantially at a local maximum as a function of the gain factor.

6. An x-ray examination apparatus as claimed in claim 5, wherein said image sensors comprise a plurality of light sensitive sensor elements, and wherein said image sensors are arranged for selectively combining signals from groups of sensor elements of said image sensors.

7. An x-ray examination apparatus as claimed in claim 2, wherein the means for concentrating the light intensity distribution produced by the radiation conversion means substantially in a single direction comprises a material that is transparent for said light and has a refractive index value greater than the refractive index value of air.

8. An x-ray examination apparatus as claimed in claim 2, wherein the image sensors are semiconductor image sensors, wherein said semiconductor image sensors are arranged for performing charge multiplication by impact ionization having an associated gain factor, a signal-to-noise ratio of an output signal produced by a respective semiconductor image sensor being substantially at a local maximum as a function of the gain factor.

9. An x-ray examination apparatus as claimed in claim 2, wherein said image sensors comprise a plurality of light sensitive sensor elements, and wherein said image sensors are arranged for selectively combining signals from groups of sensor elements of said image sensors.

10. An x-ray examination apparatus as claimed in claim 1, wherein the means for concentrating the light intensity distribution produced by the radiation conversion means substantially in a single direction comprises a material that is transparent for said light and has a refractive index value greater than the refractive index value of air.

11. An x-ray examination apparatus as claimed in claim 1, wherein the image sensors are semiconductor image sensors, wherein said semiconductor image sensors are arranged for performing charge multiplication by impact ionization having an associated gain factor, a signal-to-noise ratio of an output signal produced by a respective semiconductor image sensor being substantially at a local maximum as a function of the gain factor.

12. An x-ray examination apparatus as claimed in claim 1, wherein said image sensors comprise a plurality of light sensitive sensor elements, and wherein said image sensors are arranged for selectively combining signals from groups of sensor elements of said image sensors.

13. A radiation conversion screen, suitable for use in an x-ray examination apparatus, the radiation conversion screen comprising an x-ray sensitive phosphor layer, a further layer at a first side of the x-ray sensitive phosphor layer for transmitting x-radiation and reflecting visible radiation and, on a second side of the x-ray sensitive phosphor layer opposite the first side, a tapetum filter having a substantial transmittivity for light having an angle of incidence in a region around normal incidence and having a substantial reflectivity of light having an angle of incidence beyond said region.

* * * * *